Figure 1:
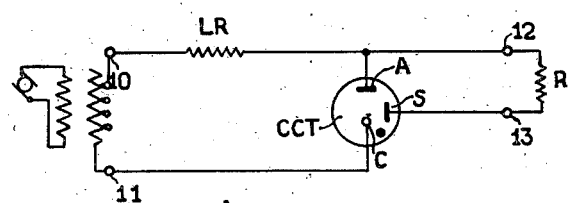

July 18, 1950  W. SAVILLE ET AL  2,515,736
ELECTRICAL RESISTANCE MEASURING ARRANGEMENT
Filed Jan. 29, 1946

INVENTORS
WILLIE SAVILLE
MERREL OMER WILLIAMS

BY
ATTORNEY

Patented July 18, 1950

2,515,736

UNITED STATES PATENT OFFICE 2,515,736

ELECTRICAL RESISTANCE MEASURING ARRANGEMENT

Willie Saville and Merrel O. Williams, Liverpool, England, assignors to Automatic Electric Laboratories Inc., Chicago, Ill., a corporation of Delaware Application January 29, 1946, Serial No. 644,140
In Great Britain February 1, 1945

1 Claim. (Cl. 175—183)

The present invention relates to electrical resistance measuring arrangements and is more particularly concerned with the testing or measurement of comparatively high resistance, for instance, insulation resistance.

The practice hitherto adopted for making insulation tests has generally been to apply across the unknown resistance a high voltage conveniently generated by a hand-driven magneto with a slipping clutch arrangement and to measure the current which then passes by a movement of the galvanometer type which is calibrated to read directly in ohms or megohms. Such an arrangement is satisfactory in many circumstances but it has the disadvantage that the test equipment is somewhat weighty and moreover requires the presence of an operator, that is to say, it cannot be arranged to give a signal automatically if the insulation resistance falls below a predetermined value. A further disadvantage which may be important in some cases is that in order to avoid the use of a sensitive but delicate measuring device, the voltage employed is several times higher than the normal working voltage and may actually damage or even break down the insulation it is intended to test.

The chief object of the invention is to provide a resistance measuring arrangement which is simple and economical to use and is readily portable and moreover does not subject the insulation to a voltage appreciably in excess of the normal working voltage.

The invention makes use of a three-electrode cold-cathode gas-discharge tube of known type, one form of which comprises a centrally mounted anode which is insulated from the cathode by a glass tube except for a small length at the top while a third electrode forming a starter electrode is located adjacent the cathode. It is already known that one of the characteristics of such a tube is that the voltage which has to be applied to the main gap, that is to say, between the cathode and anode, to cause the tube to strike varies in accordance with the value of the resistance connected between the anode and starter electrode. This characteristic is sufficiently stable that by means of a simple series of tests a calibration curve may be produced showing the relation between striking voltage and resistance in the starter electrode circuit. Moreover appreciable changes in the striking voltage are only produced by changes in resistance of the order of several megohms so that this property can be very advantageously applied to the measurement of high resistance such as insulation resistance.

According to one feature of the invention in a testing arrangement suitable for measuring high resistance such as insulation resistance, the resistance to be measured is connected between the anode and starter electrode of a three-electrode cold-cathode gas-discharge tube and the resistance value is obtained from a previously prepared calibration curve in accordance with the voltage which has to be applied between the anode and cathode to cause the tube just to strike.

According to another feature of the invention in a supervisory arrangement for giving an alarm if the value of a normally high resistance falls below a predetermined figure, the resistance is connected between the anode and starter electrode of a three-electrode cold-cathode gas-discharge tube the anode-cathode circuit of which is supplied with potential so related to the predetermined resistance value that the tube will strike when the resistance value is reached and thus give a suitable signal.

A further feature of the invention is that a portable testing unit for determining whether a resistance is greater or less than a predetermined high value comprises a dry battery of suitable voltage, a three-electrode cold-cathode gas-discharge tube having its anode and cathode connected to opposite terminals of the battery and a pair of testing probes suitable for connecting with the unknown resistance and connected respectively to the anode and starter electrode of the tube, the characteristics of the tube being so chosen that the tube will only strike if the unknown resistance is less than the predetermined value.

Figure 2:
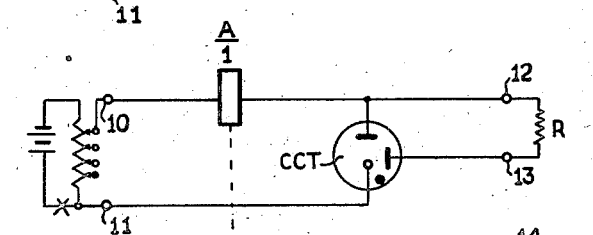
Figure 3:
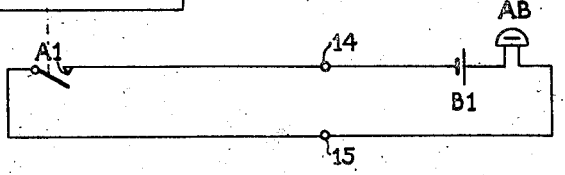
Figure 4:
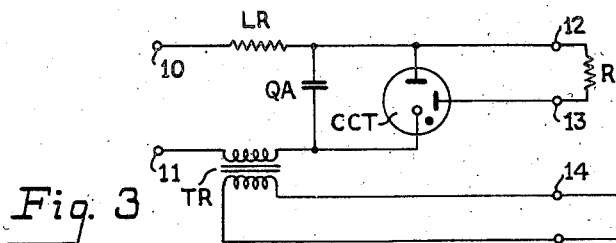

The invention will be better understood from the following description of several methods of carrying it into effect which should be taken in conjunction with the accompanying drawings comprising Figs. 1–5. Fig. 1 shows diagrammatically the general principle of the invention, Fig. 2 shows how it may be employed to give an alarm if the resistance value under test falls below a predetermined value, Fig. 3 shows how an indication of the existing resistance value may readily be given at a distance, Fig. 4 shows an alternative method of producing the same result, while Fig. 5 indicates the components of a portable test set.

Referring first to Fig. 1 the circuit includes a cold-cathode gas discharge tube CCT having a cathode C, a starter electrode S and an anode A. The operating potential, which with the type of tube contemplated may vary between 90 and 220 volts, is applied to terminals 10 and 11 in series with the limiting resistance LR, while the resistance R to be measured is connected to terminals 12 and 13 in the starter electrode circuit. The terminals 12 and 13 may take the form of testing probes by means of which connection can be readily made to suitable tapping points to include the unknown resistance.

In its simplest form this arrangement will indicate whether the resistance which it is desired to test is greater or less than a predetermined value which is the information generally required in insulation testing rather than an actual numerical value. To make this test the voltage across the terminals 10 and 11 is adjusted to the value which is found from the calibration curve to correspond to the predetermined resistance. Then when connection is made to the unknown resistance, the tube will flash or not according as this resistance is less or greater than the predetermined value.

The source of supply may be either direct or alternating current and if direct current as shown in Figs. 1 and 2 is used the tube when once struck will remain lighted until the potential is disconnected. If alternating current is used the tube will light intermittently being extinguished and re-struck on each cycle. In Figs. 3 and 4 the terminals 10 and 11 will be understood to be connected to an adjustable source of alternating current or direct current in the same manner as these terminals are connected in either Figs. 1 and 2. If it is desired to obtain a numerical value for the unknown resistance, arrangements are provided for varying the applied voltage and if direct current is being used means are also provided for opening the circuit for each change of voltage in order to extinguish the tube. The adjustment is made by gradually reducing the voltage until the tube just fails to strike whereupon the corresponding resistance value can be obtained from the calibration curve. Alternatively the equipment could include a voltmeter type movement connected across terminals 10 and 11 and calibrated directly in terms of resistance.

The arrangement according to the invention may readily be arranged to give an alarm if the insulation resistance of a piece of equipment falls below a predetermined value and for this purpose the arrangement of Fig. 2 may be used. In this case the resistance under test is permanently connected to terminals 12 and 13 and the voltage applied to terminals 10 and 11 is adjusted to correspond to the predetermined resistance value. It will readily be appreciated that if the insulation resistance falls below this value the tube will strike and the current flow will then operate relay A which is connected in the anode circuit in place of the limiting resistance LR. Relay A then at contacts A1 connects together terminals 14 and 15 thus completing a circuit for the alarm bell AB in series with battery B1. The alarm bell may if desired be located at a distance from the testing equipment. An alarm effect may also be produced without the use of the relay A if the tube itself is readily visible, since the fact that the tube is glowing will indicate that the resistance has fallen below the accepted value.

In a further development of this alarm scheme it is arranged that a tone is transmitted to a distant point if the insulation resistance falls below the critical value or the pitch of the tone may be varied in accordance with the condition of the insulation. This arrangement is shown in Fig. 3 in which the unknown resistance R is again permanently connected to terminals 12 and 13 and a capacitor QA of suitable size is connected between the anode and cathode of the tube.

The anode-cathode circuit also includes the primary winding of a transformer TR the secondary of which is connected to a signalling line extending from terminals 14 and 15 to the distant point. If the value of the insulation resistance is above the critical figure when the voltage source is first connected up, the capacitor QA will be charged to the value of the applied voltage which is not sufficient to cause the tube to strike under these conditions. If the insulation resistance now falls below the critical value, the effect on the control grid will be such as to cause the tube to strike. The capacitor QA is then discharged by the low resistance ionised path of the tube and the tube is then extinguished whereupon the capacitor again commences to charge and when it reaches the appropriate voltage the tube will again strike. This process is repeated to produce the well-known relaxation oscillations and owing to the presence of the transformer TR a characteristic tone is transmitted over the signalling line and may be made audible in the telephone receiver RT connected to the distant end. Obviously the tone may be amplified if thought desirable and may then be supplied to a loud speaker so as to give an alarm signal which could be heard in a noisy situation.

A modification of this arrangement would be to increase the voltage so that oscillations normally take place. Then with a reduction in the insulation resistance the frequency of the tone generated will be considerably greater and may be so high as to be inaudible. Accordingly, the observer at the distant end can ascertain at any time the state of the insulation resistance by listening to the pitch of the tone which is transmitted over the line.

A possible objection to this arrangement in certain circumstances is that the equipment is in constant operation and a continuous battery drain is therefore involved. This may be avoided by the arrangement illustrated in Fig. 4 in which the transformer TR is replaced by a double-wound relay IR/1 carrying a single pair of break contacts IR1 and the capacitor QA is then unnecessary. It will be seen that the contacts IR1 are included in series with the upper winding of the relay in the anode-cathode circuit of the tube and the lower winding of the relay is connected to terminals 14 and 15 to which the signalling line is connected. As long as the insulation resistance maintains its proper value the tube is unable to strike and therefore insufficient current flows through the relay to cause its operation. If the insulation resistance falls, however, the tube will strike and current will then flow through the relay and cause it to operate, whereupon in consequence of the inclusion of contacts IR1 in its circuit it will act as a buzzer and produce a tone which is transmitted by transformer action to the signalling line. With this arrangement therefore, there is no consumption of battery power during normal operation and the presence of the tone on the line represents an alarm signal.

Figure 5:
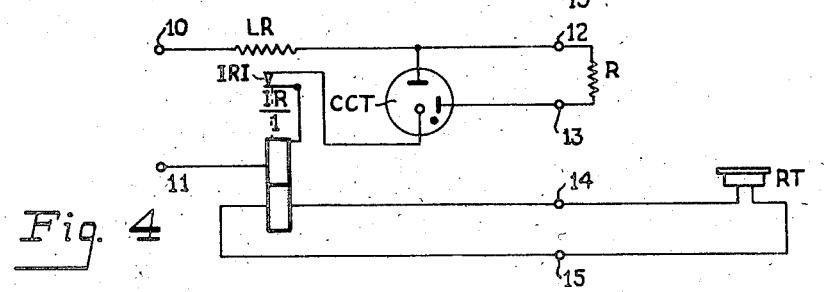
Figure 5:
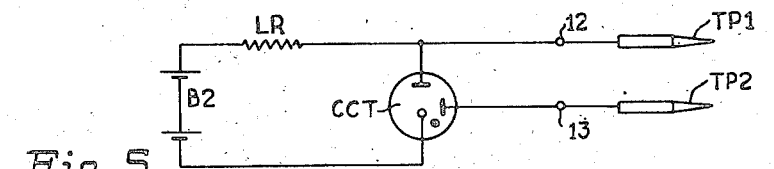

In view of the fact that for individual tests the power required is negligible, the tester according to the invention may be conveniently made up into a portable unit and operated from a dry battery, for instance of the type used for supplying the high tension voltage of a radio receiver. This arrangement is shown in Fig. 5 where it will be appreciated that the portable test unit comprises the dry battery B2 the limiting resistance LR, the tube CCT and two testing probes TP1 and TP2 which are connected to terminals 12 and 13 and serve to make connection with the resistance to be measured.

According to the invention, therefore, the measurement or comparison of high resistance is rendered possible in an extremely simple manner by compact and readily portable equipment which can be produced quite inexpensively and involves negligible running costs.

What we claim as new and desire to secure by Letters Patent is:

In a high resistance testing system for testing a resistance such as an insulation resistance, a cold cathode discharge tube having an anode, a cathode and a starter electrode, an anode-starter electrode circuit adapted to connect said test resistance to the anode and starter electrode of said cold cathode tube to provide a test circuit, a source of potential having a negative and positive terminal, an anode-cathode circuit connecting said source of potential to the anode and cathode of said cold cathode tube to provide a striking voltage in case said test resistance reaches or falls below a predetermined value, said source of potential and the characteristics of said cold cathode tube of such value that said cold cathode tube will strike instantaneously in case said test resistance reaches or falls below a predetermined value, a relay having a coil with a first and second terminal, a first connection connecting said first terminal to the positive terminal of said source of potential, a second connection connecting said second terminal in multiple with the anode of said cold cathode tube and said test resistance, said relay operating over said connections in response to said cold cathode striking, and signalling means operated in response to the operation of said relay for indicating that said test resistance has reached or has fallen below a predetermined value.

WILLIE SAVILLE.
MERREL O. WILLIAMS.

REFERENCES CITED

The following references are of record in the file of this patent:

UNITED STATES PATENTS

| Number | Name | Date |
| --- | --- | --- |
| 1,253,211 | Chubb | Jan. 15, 1918 |
| 1,938,684 | Bond et al. | Dec. 12, 1933 |
| 1,966,185 | Preisman | July 10, 1934 |
| 2,086,965 | Shepard, Jr. | July 13, 1937 |
| 2,087,783 | Savage | July 20, 1937 |
| 2,220,489 | Lowkrantz | Nov. 5, 1940 |

FOREIGN PATENTS

| Number | Country | Date |
| --- | --- | --- |
| 452,175 | Germany | Nov. 7, 1927 |